(12) United States Patent
Ito et al.

(10) Patent No.: US 9,699,961 B2
(45) Date of Patent: Jul. 11, 2017

(54) MOWING VEHICLE INCLUDING ARRANGEMENT FOR RAISING/LOWERING HEIGHT OF A MOWER UNIT

(71) Applicant: Kubota Corporation, Osaka-shi (JP)

(72) Inventors: Hirokazu Ito, Sakai (JP); Yoshitomo Fujimoto, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/956,613

(22) Filed: Dec. 2, 2015

(65) Prior Publication Data

US 2016/0295797 A1 Oct. 13, 2016

(30) Foreign Application Priority Data

Apr. 10, 2015 (JP) ................. 2015-081134

(51) Int. Cl.
| | | |
|---|---|---|
| G06F 7/70 | (2006.01) | |
| G06F 19/00 | (2011.01) | |
| G06G 7/00 | (2006.01) | |
| G06G 7/76 | (2006.01) | |
| A01D 34/00 | (2006.01) | |
| A01D 34/74 | (2006.01) | |
| A01D 101/00 | (2006.01) | |

(52) U.S. Cl.
CPC ......... *A01D 34/008* (2013.01); *A01D 34/006* (2013.01); *A01D 34/74* (2013.01); *A01D 2101/00* (2013.01)

(58) Field of Classification Search
CPC ...... A01D 34/006; A01D 75/20; A01D 75/18; A01D 75/6806; G05B 15/02
USPC ............... 701/50; 56/10.2 E, DIG. 15
See application file for complete search history.

(56) References Cited

U.S. PATENT DOCUMENTS

| | | | | |
|---|---|---|---|---|
| 2,568,822 | A * | 9/1951 | Pervis ................. | A01D 34/74 180/19.1 |
| 5,123,234 | A * | 6/1992 | Harada .............. | A01D 34/6806 56/10.2 E |
| 5,704,200 | A * | 1/1998 | Chmielewski, Jr. . | A01D 41/141 56/10.2 E |
| 8,333,057 | B2 * | 12/2012 | Schroeder ............ | A01D 41/141 56/10.2 E |
| 2006/0021312 | A1 * | 2/2006 | Brandon .............. | A01D 34/006 56/10.2 R |
| 2009/0000839 | A1 | 1/2009 | Ishii et al. | |
| 2009/0069988 | A1 * | 3/2009 | Strosser ................ | A01D 41/141 701/50 |
| 2009/0182471 | A1 * | 7/2009 | Bucher ................. | A01D 34/662 701/50 |
| 2011/0126502 | A1 * | 6/2011 | Pitman .................. | A01D 34/68 56/10.8 |

(Continued)

FOREIGN PATENT DOCUMENTS

| | | | | |
|---|---|---|---|---|
| EP | 1943894 A2 | 7/2008 | | |
| JP | 2014143984 A | * 8/2014 | ............. | A01D 34/76 |

Primary Examiner — Árpád Fábián-Kovács
(74) Attorney, Agent, or Firm — The Webb Law Firm

(57) ABSTRACT

A mowing vehicle that includes: a raising/lowering control portion 59 that changes the height of the mower unit with respect to the ground between an operation height and a non-operation height, and a management portion 55 that provides control instructions to the raising/lowering control portion 59 and a mowing blade driving control portion 58 based on a result of detection performed by a traveling state detection portion 7.

9 Claims, 5 Drawing Sheets

(56) References Cited

U.S. PATENT DOCUMENTS

| | | |
|---|---|---|
| 2012/0095636 A1 | 4/2012 | Ishii et al. |
| 2012/0159916 A1 | 6/2012 | Ishii et al. |
| 2012/0227368 A1 | 9/2012 | Koike et al. |
| 2014/0000230 A1* | 1/2014 | Kohlhase ............ A01D 41/141 56/10.2 E |
| 2014/0041351 A1* | 2/2014 | Bollin ................ A01D 41/141 56/10.2 E |
| 2014/0059989 A1 | 3/2014 | Ishii et al. |
| 2015/0305239 A1* | 10/2015 | Jung ................... A01D 41/141 701/50 |
| 2016/0007531 A1* | 1/2016 | Schlipf ............... A01D 41/141 56/10.2 E |
| 2016/0029555 A1 | 2/2016 | Ishii et al. |
| 2016/0081271 A1* | 3/2016 | Mott ................. A01D 41/1274 701/50 |

\* cited by examiner

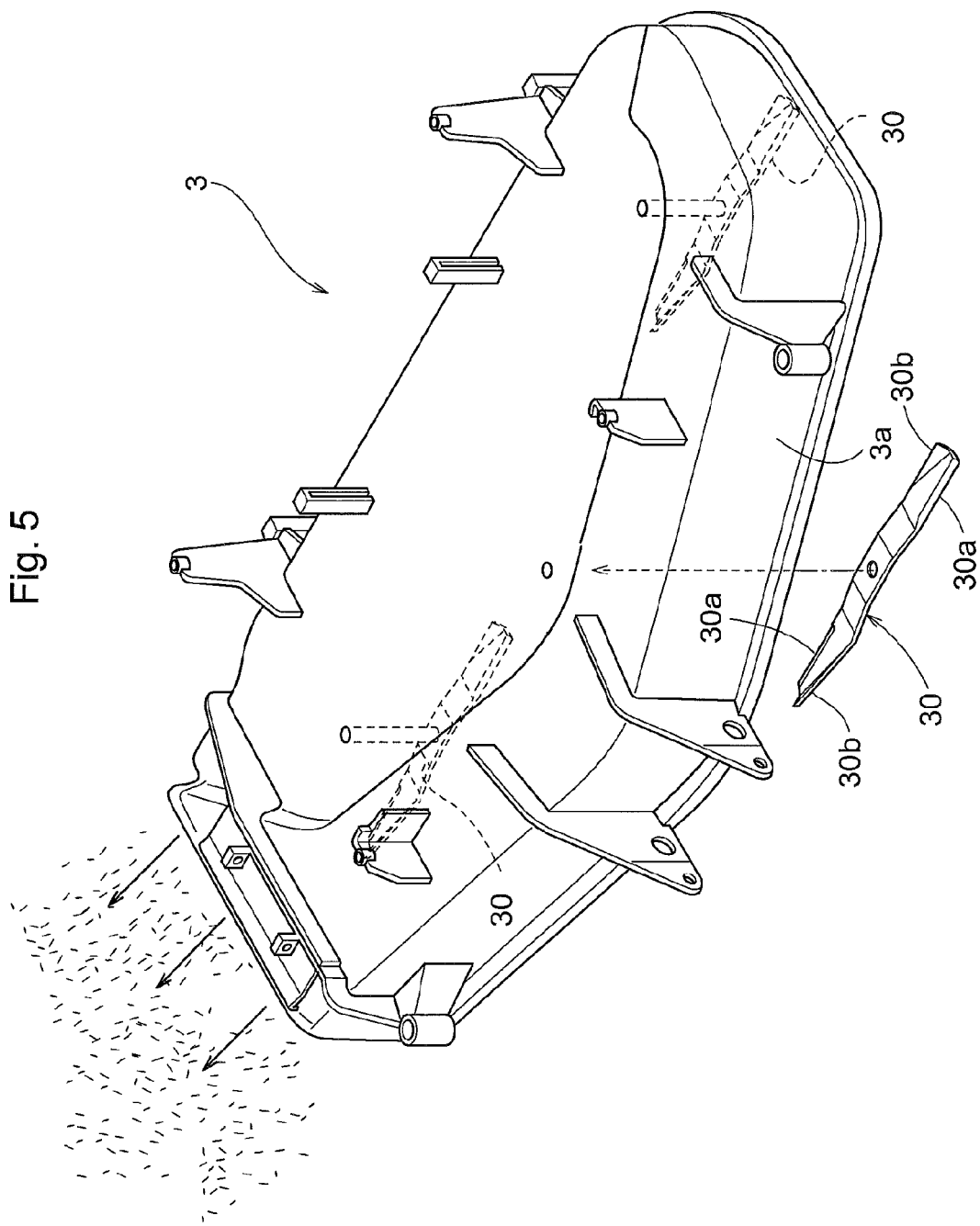

US 9,699,961 B2

MOWING VEHICLE INCLUDING ARRANGEMENT FOR RAISING/LOWERING HEIGHT OF A MOWER UNIT

CROSS-REFERENCE TO RELATED APPLICATION

This application claims priority to Japanese Patent Application No. 2015-081134 filed Apr. 10, 2015, the disclosure of which is hereby incorporated in its entirety by reference.

BACKGROUND OF THE INVENTION

Field of the Invention

The present invention relates to a mowing vehicle including a driving wheel unit, a mower unit, and a raising/lowering mechanism that changes the height of the mower unit with respect to the ground.

Description of the Related Art

A mowing vehicle, when traveling in an area other than an area to be mowed, raises its mower unit to a height above the ground so as to avoid interference with obstacles that are present on the ground as much as possible (traveling at a non-operation height). As a preparatory step for operational traveling (traveling while mowing) in an area to be mowed, the mowing vehicle lowers the mower unit close to the ground and makes minor adjustments as needed (traveling at an operation height). Furthermore, a driver driving the mowing vehicle manually drives or stops a mowing blade attached to the mower unit. As described above, driving a mowing vehicle requires that various operations be performed according to the driving conditions, which burdens the driver.

JP 2014-143984A discloses a ride-on type mowing machine including:
mowing height detection means that detects a mowing height, which is a height of the mower unit with respect to the ground, and a controlling apparatus having a speed regulating function of regulating the traveling speed to be at a predetermined speed or less if the mowing height detected by the mowing height detection means is lower than or equal to a pre-set setting value. This ride-on type mowing machine is intended to reduce the burden on the driver by performing automated control of traveling speed according to the mowing height. However, as described above, the ride-on type mowing machine requires operations such as adjusting the height of the mower unit with respect to the ground, driving or stopping the mowing blade, and the like to be performed according to the driving conditions. For this reason, there is a need for mowing vehicles that further reduce the operational burden on the driver.

SUMMARY OF THE INVENTION

A mowing vehicle according to the present invention includes a driving wheel unit that is driven by a travel driving mechanism; a traveling state detection portion that detects a traveling state including traveling and stopping of the vehicle; a mower unit that is supported by a body of the vehicle; a raising/lowering mechanism that changes a height of the mower unit with respect to the ground; a mowing blade driving mechanism that drives a mowing blade of the mower unit; a raising/lowering control portion that provides, to the raising/lowering mechanism, a raising/lowering control signal for changing the height of the mower unit with respect to the ground between an operation height and a non-operation height, the operation height being a height with respect to the ground suitable for mowing and including a lowest height, and the non-operation height being a height with respect to the ground unsuitable for mowing and including a highest height; a mowing blade driving control portion that controls driving of the mowing blade; a mower unit state detection portion that detects a state of the mower unit including the height of the mower unit with respect to the ground and driving or stopping of the mowing blade; and a management portion that provides control instructions to the raising/lowering control portion and the mowing blade driving control portion based on the traveling state detected by the traveling state detection portion and the state of the mower unit detected by the mower unit state detection portion.

According to this configuration, changing of the height of the mower unit with respect to the ground by the raising/lowering mechanism and driving of the mowing blade of the mower unit by the mowing blade driving mechanism are performed according to automated control based on the result of detection of the state of the mower unit including the height of the mower unit with respect to the ground and the driving or stopping of the mowing blade and the result of detection of the traveling state including traveling and stopping of the vehicle. As a result, it is unnecessary for the driver to perform the adjustment of the height of the mower unit with respect to the ground, the operations to drive or stop the mowing blade, and the like depending on the situation, and the adjustment of the height of the mower unit with respect to the ground, the operations to drive or stop the mowing blade, and the like are, at least in part, automatically performed according to the driving conditions, and thus the operational burden on the driver is reduced.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5 is a perspective view of a mower unit and mowing blades.

DETAILED DESCRIPTION OF THE PREFERRED EMBODIMENTS

Figure 1:
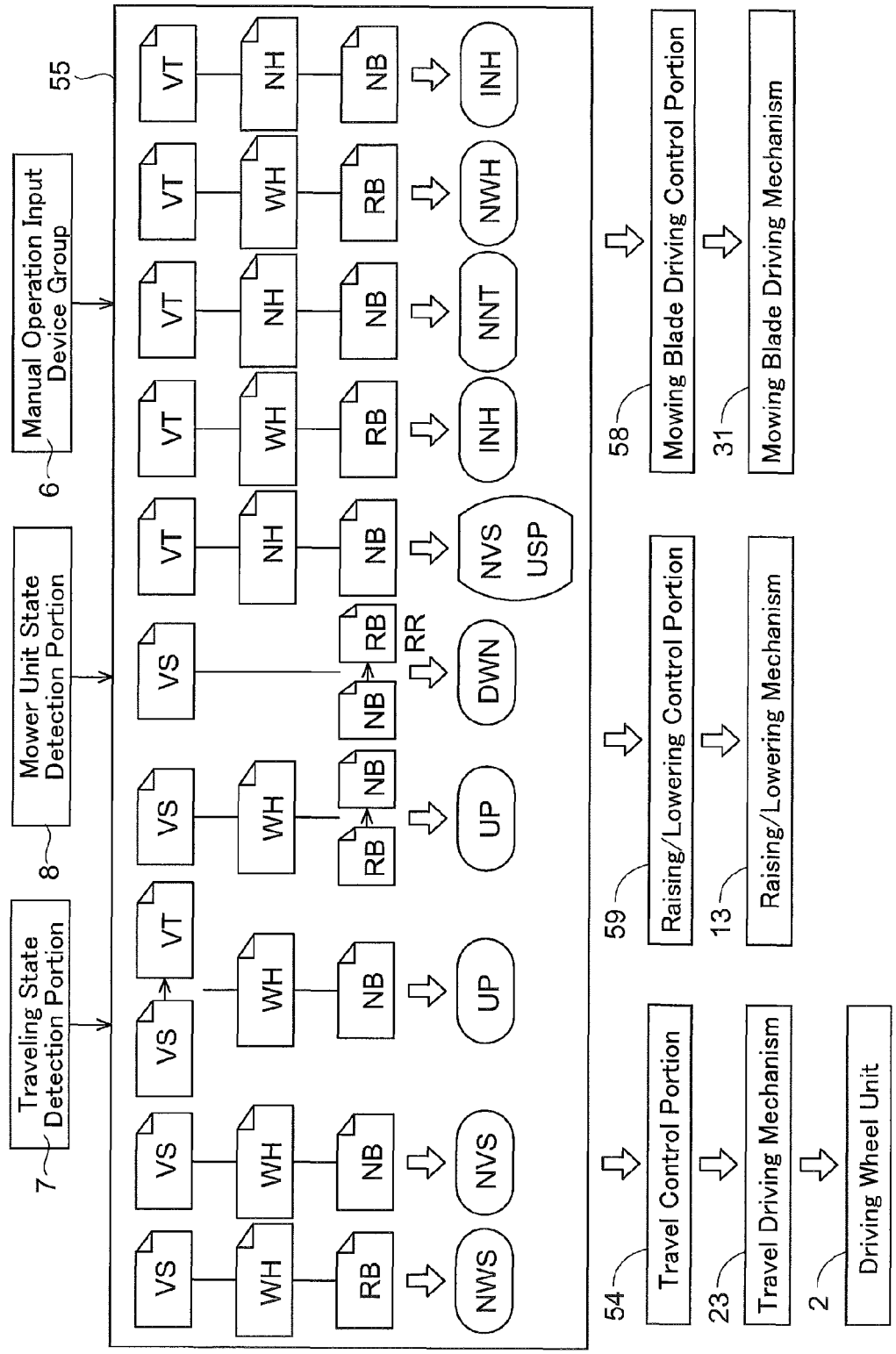
FIG. 1 is a diagram illustrating the basic principle of controlling a mowing operation according to the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Prior to a description of a specific embodiment of a mowing vehicle according to the present invention, the basic principle of controlling a mowing operation of the mowing vehicle will be described with reference to FIG. 1.

The mowing vehicle (hereinafter referred to simply as "vehicle") includes, as constituent elements whose operations are controlled by a mowing operation control system, a travel driving mechanism 23, a raising/lowering mechanism 13, and a mowing blade driving mechanism 31. The travel driving mechanism 23 transmits power to a driving wheel unit 2 so as to drive the driving wheel unit 2 to cause the vehicle to travel. The raising/lowering mechanism 13 provided in the vehicle body raises and lowers a mower unit. The mowing blade driving mechanism 31 is provided in the mower unit and is configured to transmit power to a mowing blade to drive the mowing blade. A mowing operation is carried out by causing the vehicle to travel while driving the mowing blade. The height of the mower unit with respect to the ground is changed by the mower unit being raised or lowered, and as a result of which, the mowing height of the mowing blade is changed.

The mowing operation control system includes a travel control portion 54, a management portion 55, a mowing blade driving control portion 58 and a raising/lowering control portion 59. The travel control portion 54 provides a control signal to the travel driving mechanism 23 so as to control traveling of the vehicle. The mowing blade driving control portion 58 provides a control signal to the mowing blade driving mechanism 31 so as to control driving of the mowing blade. The raising/lowering control portion 59 provides, to the raising/lowering mechanism 13, a raising/lowering control signal for changing the height of the mower unit with respect to the ground to change the height between an operation height and a non-operation height, the operation height being a height with respect to the ground that is suitable for the mower unit including the mowing blade to perform mowing, and the non-operation height being higher than the operation height. As used herein, "non-operation height" refers to, usually, a height that is suitable for the vehicle to travel at a high speed (non-operational traveling, traveling on a road or the like) and that is unlikely to cause interference with irregularities on the road surface. To be more specific, "operation height" as used in this specification is a term that refers to a height of the mower unit suitable to mow grass growing from the ground such as that in a lawn and that includes the lowest height, which is the height at which the ground rollers or the like are substantially in contact with the ground, and a height slightly higher than the lowest height, which is set by adjusting the mowing height. Likewise, "non-operation height" is a term that refers to a height of the mower unit that is suitable for the vehicle to travel not only on a road but also in an area to be mowed without being substantially mowed (the mowing blade is usually stopped during this travel mode, but the mowing blade may be rotated) and the term includes the highest height, which is the upper limit to which the height can be raised by the raising/lowering mechanism and a height slightly lower than the highest height, which is set according to upper limit settings if an upper limit setting mechanism is provided. Accordingly, depending on the specifications of the vehicle, "operation height" encompasses the case where it means the lowest height and the case where it means a height range around the lowest height, and "non-operation height" encompasses the case where it means the highest height and the case where it means a height range around the highest height.

The management portion 55 provides a control instruction to the raising/lowering control portion 59 and the mowing blade driving control portion 58 based on the traveling state of the vehicle and the state of the mower unit. The traveling state of the vehicle includes "vehicle stationary state" indicating that the vehicle has stopped, "vehicle traveling state" indicating that the vehicle is traveling, and the like. The "vehicle traveling state" may be divided into "low speed traveling state" and "high speed traveling state". The traveling state is detected by a traveling state detection portion 7, and the result of detection is then sent to the management portion 55. The state of the mower unit includes "operation height" that is a height with respect to the ground that is suitable for the mower unit to perform operations and "non-operation height" suitable for high speed traveling or the like, which are described above, as well as "mowing blade ON state" indicating that the mowing blade is driven, "mowing blade OFF state" indicating that the driving of the mowing blade is stopped, and the like. The state of the mower unit is detected by a mower unit state detection portion 8, and the result of detection is then sent to the management portion 55. With this configuration, changing of the height of the mower unit with respect to the ground by the raising/lowering mechanism 13 and driving of the mowing blade by the mowing blade driving mechanism 31 are automatically controlled based on the result of detection of the state of the mower unit and the result of detection of the traveling state including the traveling state and stationary state of the vehicle, and thus the operational burden on the driver is reduced.

Furthermore, in order to recognize an input operation performed by the driver, the management portion 55 receives an operation input signal indicating the state of a manual operation input to a manual operation input device. In the case where a manual operation input device group 6 includes a raising/lowering adjustment manual operation input device that provides a raising/lowering adjustment signal for adjusting the height of the mower unit with respect to the ground, in response to an operation input signal provided by a manual operation being input to the raising/lowering adjustment manual operation input device, a raising/lowering adjustment signal for adjusting the height of the mower unit with respect to the ground is provided to the raising/lowering control portion 59. As a result of the raising/lowering adjustment, the mowing height can be adjusted on the order of several millimeters. Manual raising/lowering adjustment is permitted when the mowing blade is driven. When the mowing blade is stopped, the manual raising/lowering adjustment is permitted only when the vehicle is stopped. The mowing height set through the raising/lowering adjustment is stored in a memory and used in the subsequent process.

The management portion 55 has constructed rules for generating control instructions for the raising/lowering control portion 59 and the mowing blade driving control portion 58 based on the traveling state of the vehicle, the state of the mower unit, and the state of manual operation. Examples of the rules are listed below:

(1) the traveling of the vehicle with the mower unit being set at the non-operation height is permitted in the initial stage of a mowing operation until the rotation of the mowing blade reaches a rated rotation, but the mowing blade is stopped when the vehicle travels for a predetermined length of time or more, or the vehicle travels a predetermined distance or more in a state in which both the non-operation height of the mower unit and the rated rotation of the mowing blade are satisfied;

(2) when it is detected that the vehicle with the mowing blade being stopped has started traveling from a vehicle stationary state, an instruction to change the height of the mower unit to the non-operation height is issued to the raising/lowering control portion 59;

(3) in a state in which the mower unit is positioned at the operation height, when it is detected that the driving of the mowing blade has been stopped, an instruction to change the height of the mower unit to the non-operation height (to raise the mower unit) is issued to the raising/lowering control portion 59;

(4) in a state in which the mower unit is positioned at the non-operation height, when it is detected that the mowing blade has been driven (mowing blade ON state) from the stopped state (mowing blade OFF state), the driving of the mowing blade reaching a rated speed is awaited, and an instruction to change the height of the mower unit to the operation height is issued to the raising/lowering control portion 59;

(5) the stopping of the vehicle, the non-operation height of the mower unit, and the stopping of the mowing blade deem a normal vehicle stationary state;

(6) the stopping of the vehicle, the operation height of the mower unit and the driving of the mowing blade deem a normal start of operation;

(7) the traveling of the vehicle, the operation height of the mower unit, and the stopping of the mowing blade deem a normal non-operational traveling state; and (8) the traveling of the vehicle, the non-operation height of the mower unit, and the driving of the mowing blade deem a normal operational traveling state.

Not all of the rules described above are required to be used. It is also possible to use other rules.

In FIG. 1, due to the space restrictions in the diagram, the following abbreviations are used:

VS: vehicle stationary state,
VT: vehicle traveling state,
WH: operation height,
NH: non-operation height,
RB: mowing blade ON state,
NB: mowing blade OFF state,
RR: rated rotation,
NWS: normal start of operation,
NVS: normal vehicle stationary state,
UP: raise,
DWN: lower,
NVS: normal vehicle stationary state,
USP: preparation to start raising,
INH: inhibit,
NNT: normal non-operational traveling, and
NWT: normal operational traveling.

Figure 2:
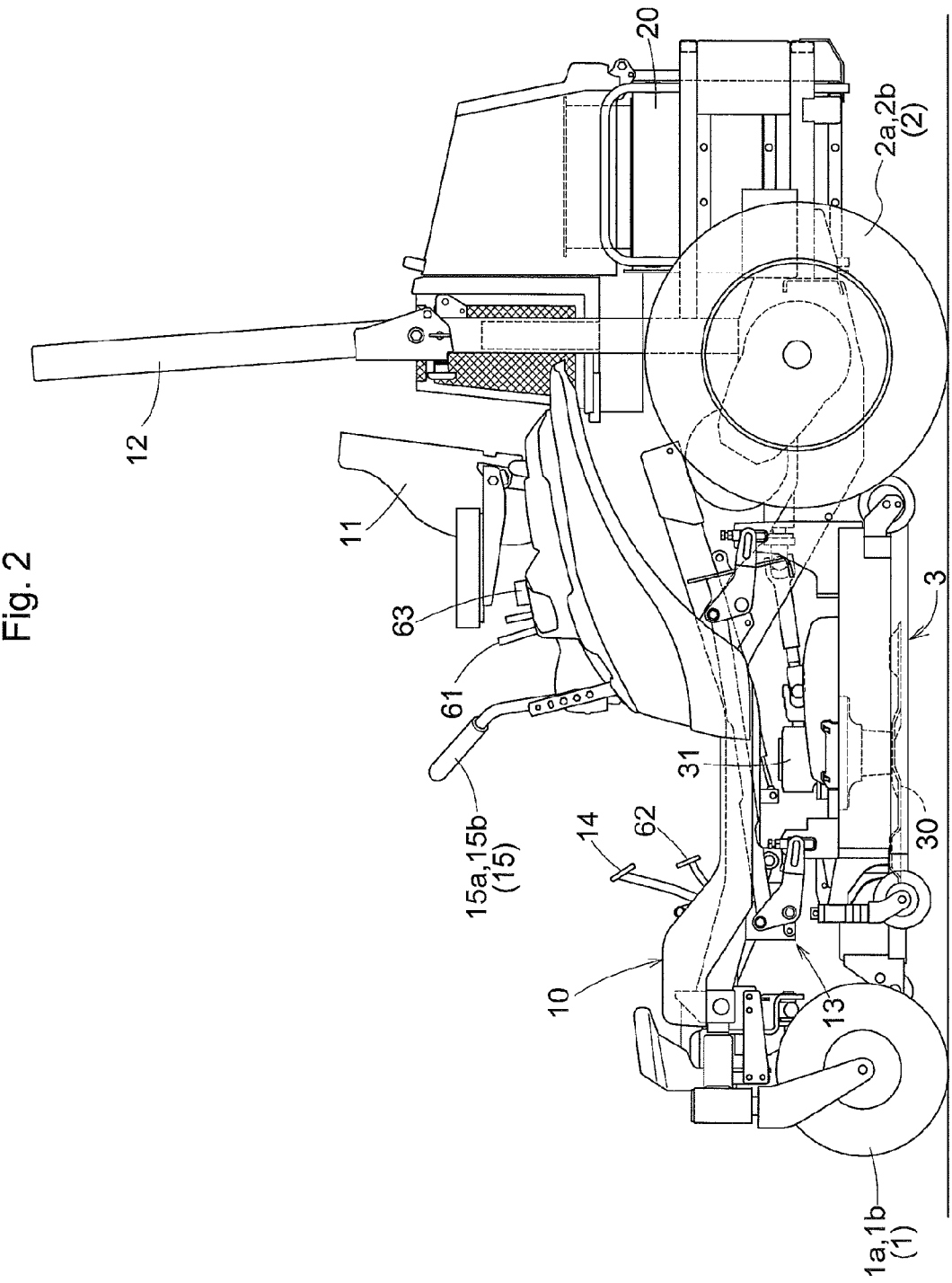
FIG. 2 is a side view of a mowing machine that is an embodiment of a mowing vehicle according to the present invention.
Figure 3:
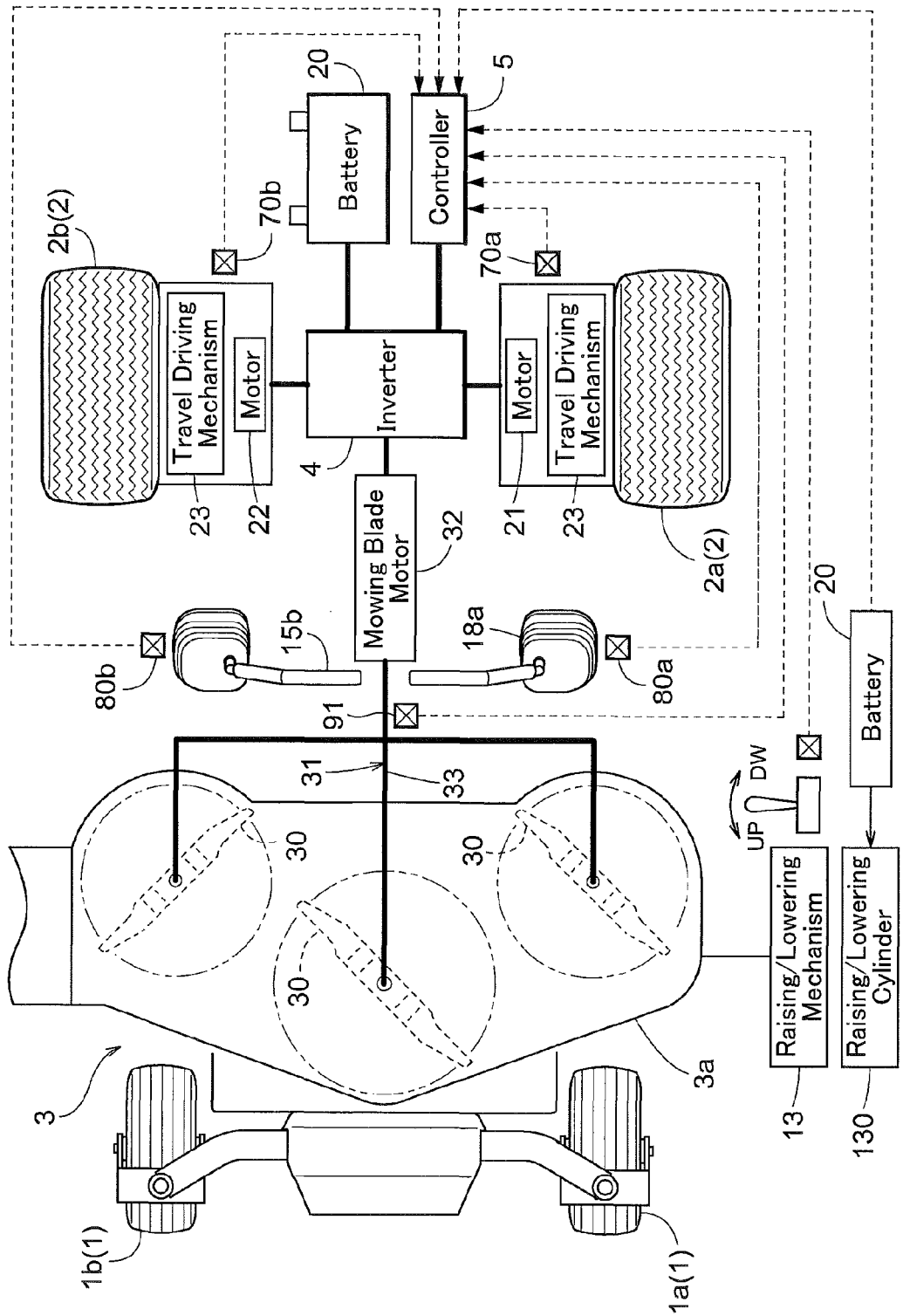
FIG. 3 is a system diagram showing an electric system and a power system of the mowing machine.

Next, a specific embodiment of a mowing vehicle to which the above-described basic principle of the system of controlling a mowing operation is applied will be described below. In the present embodiment, the mowing vehicle is a ride-on electric mowing machine (hereinafter referred to simply as "mowing machine") including a mower unit 3 in the body thereof. FIG. 2 is a side view of the mowing machine. FIG. 3 is a diagram schematically showing an electric system and a power system of the mowing machine.

The mowing machine includes a front wheel unit 1 composed of a left front wheel 1a and a right front wheel 1b of a caster type that are capable of freewheeling, a driving wheel unit 2 composed of a left rear wheel 2a and a right rear wheel 2b, a body 10 supported by the front wheel unit 1 and the driving wheel unit 2, a battery 20 disposed in the rear of the body 10, a driver's seat 11 disposed in front of the battery 20, a rollover protection frame 12 provided so as to be upright behind the driver's seat 11, and the mower unit 3 that is suspended from the body 10, so as to be capable of being raised and lowered via a raising/lowering link mechanism serving as the raising/lowering mechanism 13, in a space below the body 10 between the front wheel unit 1 and the driving wheel unit 2.

In front of the driver's seat 11, a floor plate is provided that serves as a foot rest on which the driver's foot is placed, and a brake pedal 14 protrudes from the floor plate. A steering unit 15 is disposed as one of the manual operation input devices of the manual operation input device group 6, the steering unit 15 being composed of a left steering lever 15a and a right steering lever 15b that are provided on opposite sides of the driver's seat 11 and swing about a horizontal swing shaft in the transverse direction of the vehicle body. Furthermore, in the periphery of the driver's seat 11, a mowing blade operation lever (or switch) 61, a mower unit raising/lowering pedal (or lever) 62, and a mowing height adjustment dial 63 for adjusting the mowing height, which serves as a raising/lowering adjustment manual operation input device, are provided as manual operation input devices of the manual operation input device group 6.

As shown in FIG. 3, a left motor 21 and a right motor 22 that are electric actuators for rotationally driving the left rear wheel 2a and the right rear wheel 2b, respectively, are provided. The rotation speeds of the left motor 21 and the right motor 22 are changed by the amounts of electric power supplied independently to the left motor 21 and the right motor 22 via an inverter 4. Accordingly, the rotation speeds of the left rear wheel 2a and the right rear wheel 2b can be set to different speeds, and the difference in speed between the left rear wheel 2a and the right rear wheel 2b allows the mowing machine to change its direction. In the present embodiment, travel driving mechanisms 23 are provided between the left motor 21 and the left rear wheel 2a and between the right motor 22 and the right rear wheel 2b so as to transmit power therebetween. In the case where the left motor 21 and the right motor 22 are in-wheel motors, the travel driving mechanisms 23 may be omitted.

In the present embodiment, as shown in FIG. 3, the mower unit 3 is of a side discharge type with three mowing blades (blades), and includes a mower deck 3a and three rotatable mowing blades 30. The mowing blade driving mechanism 31 that rotationally drives the mowing blades 30 includes a mowing blade motor 32, which is an electric actuator, and a mowing blade power transmission mechanism 33 that transmits the power of the mowing blade motor 32 to the mowing blades 30.

The mower deck 3a of the mower unit 3 is composed of a ceiling surface and a vertical wall extending downward from a front edge portion of the ceiling surface.

The three mowing blades 30 are supported by the mower deck 3a so as to be capable of rotation. As shown in FIG. 5, each mowing blade 30 has cutting edges 30a at opposite end portions thereof and wind generating vanes 30b respectively formed on the back side of the cutting edges.

In a mowing operation, by the mowing machine traveling while rotating the mowing blades 30, the mowed grass that has been cut by the mowing blades 30 is guided to a baffle plate by the wind generated by the wind generating vanes 30b of the mowing blades 30, conveyed into the mower deck 3a toward one horizontal side, where a discharge outlet is provided, and then discharged laterally outside of the mower deck 3a through the discharge outlet.

The mower unit 3 is capable of being raised and lowered by the raising/lowering link mechanism serving as the raising/lowering mechanism 13. In the present embodiment, the raising and lowering of the raising/lowering mechanism 13 is performed by extension and retraction operations of an electric raising/lowering cylinder 130, which is an electric actuator. Under control of a controller 5, the raising/lowering mechanism 13 can raise and lower the mower deck 3a between the maximum height and the minimum height in units of several millimeters.

Figure 4:
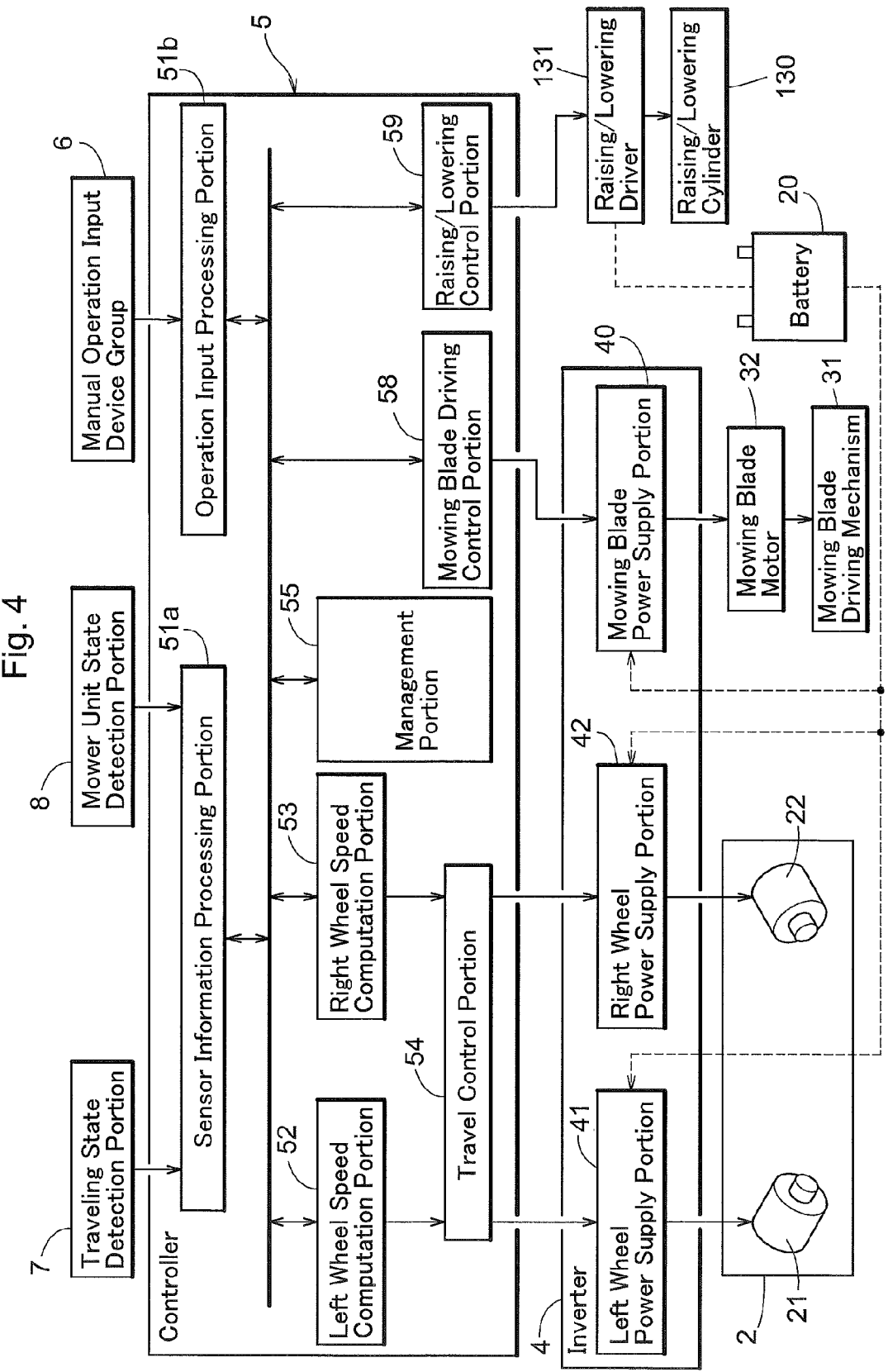
FIG. 4 is a functional block diagram of a control system of the mowing machine.

As shown in FIGS. 3 and 4, power supply to the left motor 21 and the right motor 22 for traveling and power supply to the mowing blade motor 32 for mowing are performed according to inverter control performed by the controller 5, which is also called "ECU". Accordingly, the inverter 4 connected to the battery 20 includes a mowing blade power supply portion 40 that supplies power to the mowing blade motor 32, a left wheel power supply portion 41 that supplies power to the left motor 21, and a right wheel power supply portion 42 that supplies power to the right motor 22. The power supply from the battery 20 to the raising/lowering cylinder 130 of the raising/lowering mechanism 13 is performed by a raising/lowering driver 131 controlled by the controller 5.

As shown in FIG. 4, the controller 5 is connected to the traveling state detection portion 7, the mower unit state detection portion 8 and the manual operation input device group 6. The traveling state detection portion 7 includes sensors that detect traveling information such as a left rear wheel rotation detection sensor 70a that detects the number of rotations of the left rear wheel 2a (see FIG. 3), and a right rear wheel rotation detection sensor 70b that detects the number of rotations of the right rear wheel 2b (see FIG. 3). The mower unit state detection portion 8 includes a sensor that detects the raised/lowered height of the mower unit and a sensor 91 that detects the driving state of the mowing blades 30 (see FIG. 3). The manual operation input device group 6 includes detection sensors that detect the positons of the mowing blade operation lever 61, the mower unit raising/lowering lever 62 and the mowing height adjustment dial 63 to which they have been operated, and other sensors. Furthermore, the manual operation input device group 6 also includes sensors that detect steering information such as a left steering angle detection sensor 80a that detects the swinging angle of the left steering lever 15a, a right steering angle detection sensor 80b that detects the swinging angle of the right steering lever 15b, and a brake detection sensor that detects the operation angle of the brake pedal 14.

The controller 5 includes functional portions such as a sensor information processing portion 51a, an operation input processing portion 51b, a left wheel speed computation portion 52, a right wheel speed computation portion 53, the travel control portion 54, the management portion 55, the mowing blade driving control portion 58 and the raising/lowering control portion 59. The functional portions are substantially implemented through execution of a program, but may be configured by hardware as needed. The sensor information processing portion 51a processes sensor signals input from the traveling state detection portion 7 and the mower unit state detection portion 8 so as to convert the sensor signals into information that can be used within the controller 5. The operation input processing portion 51b processes sensor signals input from the manual operation input device group 6 so as to convert the sensor signals into information that can be used within the controller 5.

The left wheel speed computation portion 52 determines the rotation speed (the number of rotations) of the left rear wheel 2a, or in other words, the rotation speed (the number of rotations) of the left motor 21 based on operation information input through the left steering angle detection sensor 80a that detects the amount of operation of the left steering lever 15a performed by the driver. The right wheel speed computation portion 53 also determines the rotation speed (the number of rotations) of the right rear wheel 2b, or in other words, the rotation speed (the number of rotations) of the right motor 22 based on operation information input through the right steering angle detection sensor 80b that detects the amount of operation of the right steering lever 15b performed by the driver.

The travel control portion 54 provides, to the left wheel power supply portion 41 and the right wheel power supply portion 42, control signals for transmitting, to the left motor 21 and the right motor 22, electric power required to implement the rotation speed of the left motor 21 and the rotation speed of the right motor 22 determined by the left wheel speed computation portion 52 and the right wheel speed computation portion 53.

The management portion 55, the mowing blade driving control portion 58, and the raising/lowering control portion 59 can operate based on the principle of control described with reference to FIGS. 1 and 2. In particular, the management portion 55 has a function of automatically controlling either one or both of the raising and lowering of the mower unit 3 and the driving of the mowing blades 30 according to the traveling state of the mowing machine and the state of the mower unit 3 detected by sensors or the like. Accordingly, the driver's burden is reduced.

One important function of the mowing machine is to automatically raise the mower unit 3 to the highest height during traveling for movement (during non-operational traveling), and automatically lower the mower unit 3 to a pre-set height (operation height) by using the driving of the mowing blades 30 as a trigger.

Examples of the functions that can be implemented by the mowing machine are listed below:

(1) the mower unit 3 is adjusted to an arbitrary height according to the operation of the mowing height adjustment dial 63 performed by the driver when the vehicle is stopped;

(2) the mower unit 3 is automatically raised to the highest height when the vehicle is traveling;

(3) in response to the mowing blade operation lever 61, which operates the mowing blades 30 to be ON (driven) and OFF (stopped), being turned ON, the mowing blade motor 32 is activated, with the mower unit 3 being set at the highest height, and thereafter, the mower unit 3 is lowered to a setting height that has been set and stored in advance, and as a result of which, it is possible to prevent an overload that can be caused by grass at the time of activation of the mowing blade motor 32; and (4) the vehicle speed is reduced if an overload occurs in the mowing blade motor 32 or insufficient rotation of the mowing blades 30 occurs due to densely grown grass or the like during a mowing operation.

As another embodiment, instead of reducing the vehicle speed in (4), the mower unit 3 may be raised. Alternatively, in (4), if the mowing blade motor 32 is overloaded or the mowing blades 30 rotate insufficiently even when the mower unit 3 is raised, the mowing blade motor 32 may be reversely rotated for a certain length of time and thereafter forwardly rotated. This utilizes the phenomenon that when the mowing blades 30 are forwardly rotated, the load increases with the cutting edges 30a of the mowing blades 30 coming into contact with densely grown grass whereas when the mowing blades 30 are reversely rotated, the wind generating vanes 30b of the mowing blades 30 dislodge densely grown grass to reduce the load.

In the embodiment described above, an electric mowing machine is used, but the mowing vehicle may be an engine-driven mowing vehicle. In the case of an engine-driven mowing vehicle, the mowing blades 30 are driven by engine power. Accordingly, the mowing blade power transmission mechanism 33 is equipped with a so-called PTO clutch, and thus it is unnecessary to provide the mowing blade motor 32. The driving or stopping of the mowing blades 30 is performed by the PTO clutch being turned ON or OFF. Instead of the electric raising/lowering cylinder 130 of the raising/lowering mechanism 13, a hydraulic cylinder may be used. The hydraulic cylinder performs extension and retraction operations as a result of the hydraulic pressure from a hydraulic pump driven by engine power being controlled by a hydraulic valve, and thereby raises the mower unit 3. It is of course possible to use a configuration in which electric power converted from engine power is provided to the electric raising/lowering cylinder 130. It is also possible to use, instead of the travel driving mechanism 23 including the left motor 21 and the right motor 22 for traveling, a travel driving mechanism including an automatic transmission apparatus (HST or the like) that changes engine power to an arbitrary speed. Even an engine-driven mowing vehicle configured as described above can provide control as described above and the advantageous effects thereof. Accordingly, the present invention is also applicable to an engine-driven mowing vehicle.

For example, the following variations are also encompassed by the present invention.

(1) In the embodiment described above, the mowing vehicle is a mid-mounted mower in which the mower unit 3 is disposed between the front wheels and the rear wheels, but may be a front mower in which the mower unit 3 is disposed in front of the front wheels.

(2) In the embodiment described above, the mowing vehicle is a so-called "zero turn" vehicle in which the left rear wheel 2a and the right rear wheel 2b of the driving wheel unit 2 can be driven independently, but may be a vehicle in which the left rear wheel 2a and the right rear wheel 2b are connected by a differential mechanism.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

The present invention is applicable to a mowing vehicle having a mower unit that can be raised and lowered.

What is claimed is:

1. A mowing vehicle comprising:
   a driving wheel unit that is driven by a travel driving mechanism;
   a traveling state detection portion that detects a traveling state including traveling and stopping of the vehicle;
   a mower unit that is supported by the vehicle;
   a raising/lowering mechanism that changes a height of the mower unit with respect to ground;
   a mowing blade driving mechanism that drives a mowing blade of the mower unit;
   a raising/lowering control portion that provides, to the raising/lowering mechanism, a raising/lowering control signal for changing the height of the mower unit with respect to the ground between an operation height and a non-operation height, the operation height being a height with respect to the ground suitable for mowing and including a lowest height, and the non-operation height being a height with respect to the ground unsuitable for mowing and including a highest height;
   a mowing blade driving control portion that controls driving of the mowing blade;
   a mower unit state detection portion that detects a state of the mower unit including the height of the mower unit with respect to the ground and driving or stopping of the mowing blade; and
   a management portion that provides control instructions to the raising/lowering control portion and the mowing blade driving control portion based on the traveling state detected by the traveling state detection portion and the state of the mower unit detected by the mower unit state detection portion.

2. The mowing vehicle according to claim 1, wherein raising the mower unit from the operation height to the non-operation height and lowering the mower unit from the non-operation height to the operation height are automatically performed by the management portion.

3. The mowing vehicle according to claim 1, wherein the management portion issues an instruction to change the height of the mower unit to the non-operation height, upon detection of traveling of the vehicle from stopping of the vehicle while the mowing blade is stopped.

4. The mowing vehicle according to claim 1, wherein the management portion issues an instruction to change the height of the mower unit to the non-operation height, upon detection of stopping of the mowing blade from driving of the mowing blade when the mower unit is at the operation height.

5. The mowing vehicle according to claim 1, wherein the management portion issues an instruction to change the height of the mower unit to the operation height after waiting for driving of the mowing blade to reach a rated speed, upon detection of driving of the mowing blade from stopping of the mowing blade when the mower unit is at the non-operation height.

6. The mowing vehicle according to claim 1, comprising:
   a manual operation input device that provides, to the raising/lowering control portion, a raising/lowering adjustment signal for adjusting the height of the mower unit with respect to the ground through a manual operation.

7. The mowing vehicle according to claim 6, wherein adjustment of the height of the mower unit with respect to the ground that is based on the raising/lowering adjustment signal is permitted as long as driving of the mowing blade is detected.

8. The mowing vehicle according to claim 6, wherein when stopping of the mowing blade is detected, adjustment of the height of the mower unit with respect to the ground based on the raising/lowering adjustment signal is permitted as long as stopping of the vehicle is detected.

9. The mowing vehicle according to claim 1, wherein power sources for the travel driving mechanism, the raising/lowering mechanism, and the mowing blade driving mechanism are electric actuators.

* * * * *